(12) United States Patent
Stotler et al.

(10) Patent No.: US 7,216,793 B2
(45) Date of Patent: May 15, 2007

(54) FRICTION STIR WELDING TRAVEL AXIS LOAD CONTROL METHOD AND APPARATUS

(75) Inventors: Timothy V. Stotler, Columbus, OH (US); Timothy J. Trapp, Columbus, OH (US)

(73) Assignee: Edison Welding Institute, Inc., Columbus, OH (US)

( * ) Notice: Subject to any disclaimer, the term of this patent is extended or adjusted under 35 U.S.C. 154(b) by 286 days.

(21) Appl. No.: 10/853,804

(22) Filed: May 26, 2004

(65) Prior Publication Data

US 2005/0040209 A1    Feb. 24, 2005

Related U.S. Application Data

(60) Provisional application No. 60/497,103, filed on Aug. 22, 2003.

(51) Int. Cl.
*B23K 20/12* (2006.01)

(52) U.S. Cl. .................... 228/112.1; 228/2.1; 228/102

(58) Field of Classification Search .............. 228/2.1, 228/8, 9, 102, 105, 112.1
See application file for complete search history.

(56) References Cited

U.S. PATENT DOCUMENTS

| | | | |
|---|---|---|---|
| 5,138,127 A | | 8/1992 | Fries et al. |
| 5,714,734 A * | | 2/1998 | Peterson et al. ........ 219/130.21 |
| 5,813,592 A * | | 9/1998 | Midling et al. .......... 228/112.1 |
| 6,153,848 A * | | 11/2000 | Nagae et al. ................ 219/110 |
| 6,168,066 B1 | | 1/2001 | Arbegast |
| 6,213,379 B1 * | | 4/2001 | Takeshita et al. ........ 228/112.1 |
| 6,299,050 B1 | | 10/2001 | Okamura et al. |
| 6,421,578 B1 * | | 7/2002 | Adams et al. .............. 700/212 |
| 6,497,355 B1 | | 12/2002 | Ding et al. |
| 6,499,649 B2 | | 12/2002 | Sayama et al. |
| 6,779,708 B2 * | | 8/2004 | Slattery .................... 228/112.1 |
| 6,780,525 B2 * | | 8/2004 | Litwinski ................... 428/615 |
| 6,926,970 B2 * | | 8/2005 | James et al. ................ 428/615 |
| 7,032,801 B2 * | | 4/2006 | Raether et al. .............. 228/2.1 |
| 2003/0028281 A1 | | 2/2003 | Adams et al. |

* cited by examiner

*Primary Examiner*—Patrick Joseph Ryan
*Assistant Examiner*—Michael Aboagye
(74) *Attorney, Agent, or Firm*—Gallagher & Dawsey Co., LPA; David J. Dawsey; Michael J. Gallagher (57) ABSTRACT

A friction stir welding (FSW) travel axis load control method and apparatus for controlling a travel axis load applied to a FSW setup during the joining of workpieces by FSW. The method and apparatus recognize that controlling certain attributes of a friction stir welding plasticized region are key to controlling the quality of the resulting weld. This invention controls any of a number of qualities associated with the plasticized region thereby producing welds having improved mechanical and aesthetic properties, as well as extending the life of the FSW tool. The method and apparatus may control the FSW process to obtain a predetermined optimum size of a heat affected zone. The plasticized region may be monitored in a number of ways including, but not limited to, force on the tool, torque applied to the tool, workpiece temperature, plasticized region physical dimension, as well as changing surface characteristics such as color and reflectivity.

29 Claims, 4 Drawing Sheets

FRICTION STIR WELDING TRAVEL AXIS LOAD CONTROL METHOD AND APPARATUS

RELATED APPLICATIONS

This application claims the benefit of U.S. provisional patent application Ser. No. 60/497,103, filed Aug. 22, 2003, all of which is incorporated by reference as if completely written herein.

STATEMENT REGARDING FEDERALLY SPONSORED RESEARCH OR DEVELOPMENT

This invention was not made as part of a federally sponsored research or development project.

TECHNICAL FIELD

The present invention relates to the field of friction stir welding; particularly, to a method and apparatus for monitoring and controlling the load applied to a friction stir welding tool during friction stir welding.

BACKGROUND OF THE INVENTION

Those in the wide ranging materials joining industries have recognized the benefits of friction stir welding (FSW) since its invention, only to be precluded from widespread application due to a number of factors. One such long-recognized need has been that of providing a system that monitors and controls the load placed upon a FSW tool in the direction of travel of the tool thereby improving both the aesthetic and mechanical properties of a weld. This need is particularly prevalent in joining members having complex curvatures and variable thicknesses.

FSW is a relatively simple method of solid phase welding developed by The Welding Institute in the early 1990's. The process utilizes a specially shaped nonconsumable cylindrical tool with a profiled probe, often threaded, extending from a shoulder of the tool. The tool is rotated and plunged into a joint formed by abutting edges of the workpieces that are to be joined until a surface of the shoulder contacts the surface of the workpieces. The rotating tool plasticizes a region of the workpieces around the probe and beneath the shoulder. The tool is then advanced along the joint. The rotation of the tool develops frictional heating of the workpieces and the tool forces plasticized workpiece material from the leading edge of the tool to the rear of the tool, while the shoulder confines the plasticized material from above and the plasticized material consolidates and cools to form a high quality weld.

The FSW tool is generally formed as a cylindrical piece with a shoulder face that meets a probe that projects from the shoulder face at a right angle, as illustrated in U.S. Pat. Nos. 5,460,317 and 6,029,879. In some instances, the probe actually moves in a perpendicular direction in an aperture formed in the face of the shoulder, as illustrated in U.S. Pat. Nos. 5,611,469; 5,697,544; and 6,053,391. The face of the shoulder may be formed with an upward dome that is perpendicular to the probe, as illustrated in U.S. Pat. Nos. 5,611,479; 5,697,544; and 6,053,391. The dome region and an unobstructed shoulder face to probe interface are considered essential for the proper frictional heating of the workpiece material. The dome region serves to constrain plasticized material for consolidation at the trailing edge of the FSW tool so as to prevent it from extruding out from under the sides of the tool.

Since FSW is a solid-state process, meaning there is no melting of the materials, many of the problems associated with other fusion welding methods are avoided, including porosity, solidification cracking, shrinkage, and difficulties in weld pool positioning and control. Additionally, FSW minimizes distortion and residual stresses. Further, since filler materials are not used in FSW, issues associated with chemical segregation are avoided. Still further, FSW has enabled the welding of a wide range of alloys that were previously unweldable. Another advantage of FSW is that it does not have many of the hazards associated with other welding means such as welding fumes, radiation, high voltage, liquid metals, or arcing. Additionally, FSW generally has only three process variables to control (rotation speed, travel speed, and pressure), whereas fusion welding often has at least twice the number of process variables (purge gas, voltage, amperage, wire feed speed, travel speed, shield gas, and arc gap, just to name a few). Perhaps most importantly, the crushing, stirring, and forging of the plasticized material by the FSW tool produces a weld that is more reliable than conventional welds and maintains material properties more closely to those of the workpiece properties, often resulting in twice the fatigue resistance found in fusion welds.

Despite all the advantages of FSW, it has only found very limited commercial application to date due to many difficulties associated therewith. Modern FSW tools have relatively limited control systems. Such systems are primarily designed to simply join two identical flat members together by FSW. During joining, the FSW tool is moved through the joint at a constant speed, or conversely the workpieces are moved relative to the FSW tool at a constant speed. This constant speed control is the cause of many problems. First, the load that is required to be applied to the FSW tool in the direction of travel to ensure a constant speed varies throughout the welding process. Therefore, as it becomes more difficult to force the tool through the workpieces, due to any number of circumstances, a greater load is applied to the tool in the direction of travel, often resulting in a broken tool permanently solidified in the weld. Further, if the tool does not break, such widely variable loads result in premature tool wear. The load required to force the tool through the workpieces may vary due to temperature variations in the workpieces; thickness variations; as well as intended, or unintended, heat sinks resulting in a variable thermal profile over the length of the weld; among many other reasons. Forcing the tool through such regions of variable resistance at a constant speed often results in reduced weld quality due to inadequate mixing of the plasticized materials and reduced aesthetic quality due to overheating of the materials. Prior art attempts to deal with such issues have been focused on establishing multiple travel speeds along the length of the weld. For example, in joining workpieces that are eight feet in length; a first region, possibly by way of example, the first twelve inches, may be set to have a tool travel speed of one predetermined rate; a second region, perhaps the next seventy-two inches, having a tool travel speed of a second predetermined rate; and a third region, the remaining twelve inches, having a tool travel speed of a third predetermined rate. As a result of such crude stepped constant speed control, FSW has been limited to welds of simple travel paths on relatively simple components, thereby preventing widespread use in the material joining arts. In particular, these limitations have restricted the use of FSW on components having complex properties.

The instant invention addresses many of the shortcomings of the prior art and allows for previously unavailable benefits. A method for travel axis load control during friction stir welding has long been needed. The method and apparatus of the present invention is designed to overcome the travel speed and load control limitations of the prior art. Additionally, the method and apparatus do not introduce limitations into the FSW process and opens up the application of FSW to a wide variety of applications which were previously uneconomical. Further, the method and apparatus may adjust the load on the FSW tool in the direction of travel at a controlled rate to achieve an optimum thermal profile during welding. Alternatively, the method and apparatus may adjust or limit the load on the FSW tool based upon characteristics of the tool material, rather than on properties of the material being welded.

SUMMARY OF INVENTION

In its most general configuration, the present invention advances the state of the art with a variety of new capabilities and overcomes many of the shortcomings of prior methods in new and novel ways. In its most general sense, the present invention overcomes the shortcomings and limitations of the prior art in any of a number of generally effective configurations.

In one of the many preferable configurations, the friction stir welding (FSW) travel axis load control method and apparatus controls a travel axis load applied to a friction stir welding setup during the joining of workpieces by friction stir welding. The workpieces are placed in close proximity to one another thereby forming a joint. The friction stir welding setup includes a mobile, or stationary, friction stir welding tool having a probe for plunging into the joint and a shoulder, and may include a mobile, or stationary, mounting table. The FSW travel axis load control method and apparatus of the instant invention may be used to control the load applied to a mobile FSW tool as it is moved through a joint formed of stationary workpieces, or conversely it may be used to control the load applied to a mobile table as it moves the workpieces against a stationary FSW tool. The controlled travel axis load may be multi-dimensional and used in joining workpieces having complex and varying shapes, variable thickness, variable material characteristics, and variable thermal properties.

The present method and apparatus recognize that controlling certain attributes of a friction stir welding plasticized region are key to controlling the quality of the resulting weld. FSW begins with the step of plunging a rotating tool into the joint between the first and the second workpieces, thereby creating a plasticized region. The plasticized region is characterized by a plasticized size having a plurality of dimensions, such as a width, length, and tool lead dimension. The present invention controls any of a number of qualities associated with the plasticized region thereby producing a weld having improved mechanical and aesthetic properties, as well as extending the life of the FSW tool. Additionally, the method and apparatus may control the FSW process to obtain a predetermined optimum size of a heat affected zone (HAZ).

Numerous variations, modifications, alternatives, and alterations of the various preferred embodiments, processes, and methods may be used alone or in combination with one another as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

DETAILED DESCRIPTION OF THE INVENTION

The friction stir welding travel axis load control method and apparatus enables a significant advance in the state of the art. The preferred embodiments of the method and apparatus accomplish this by new and novel methods that are configured in unique and novel ways and which demonstrate previously unavailable but preferred and desirable capabilities. The description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 1:
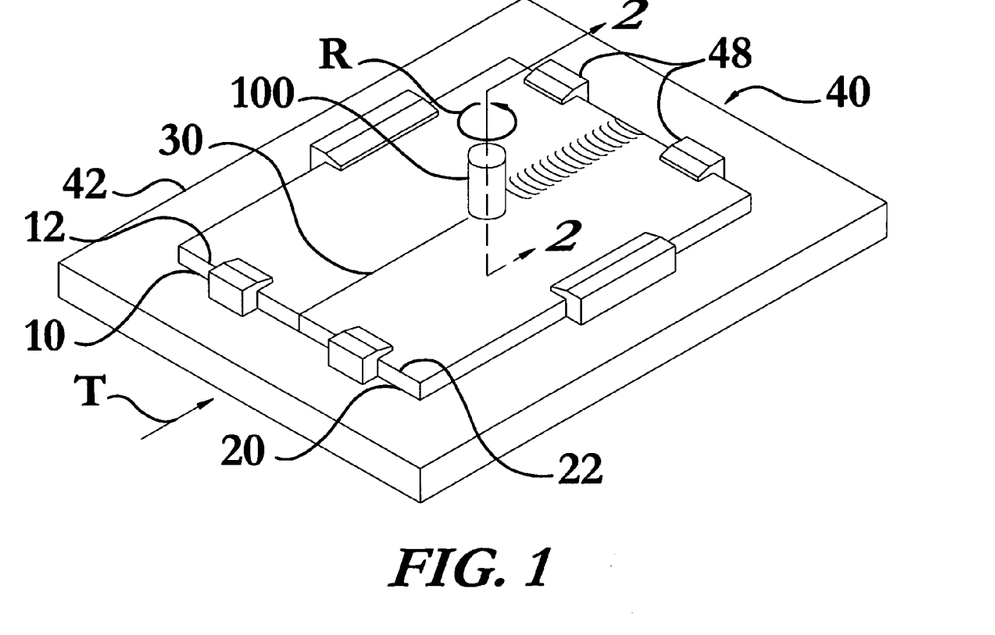
FIG. 1 shows typical friction stir welding setup in elevated perspective view.
Figure 2:
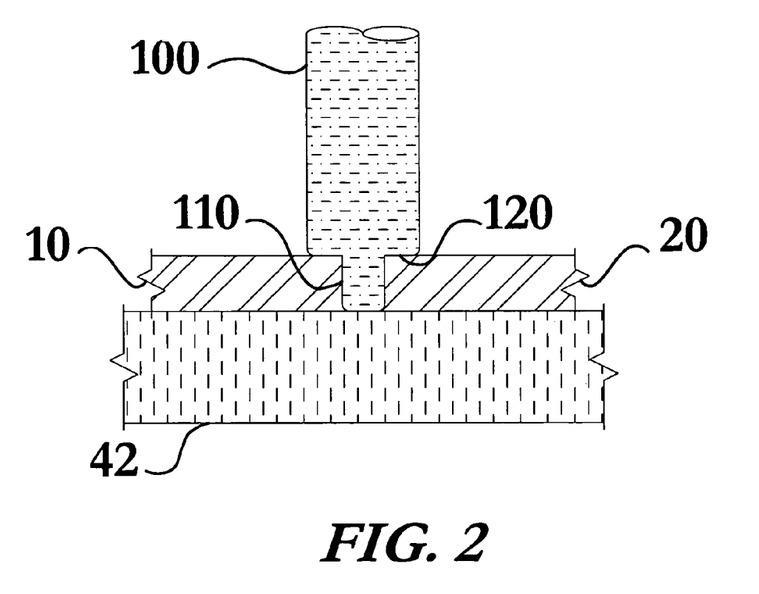
FIG. 2 shows a partial cross-sectional view taken along section line 2—2 in FIG. 1.
Figure 3:
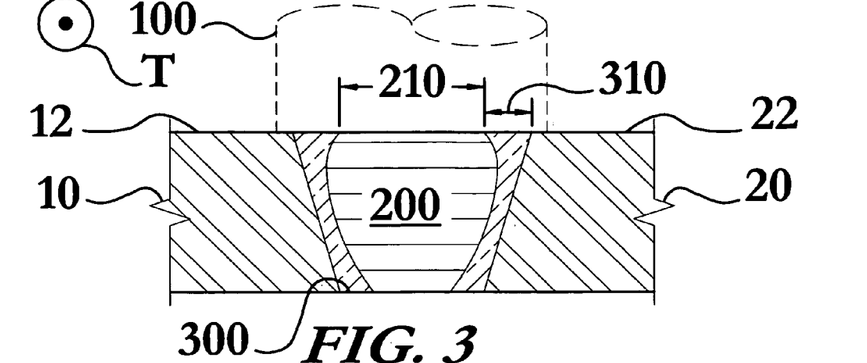
FIG. 3 shows a partial cross-sectional view of a friction stir weld.
Figure 4:
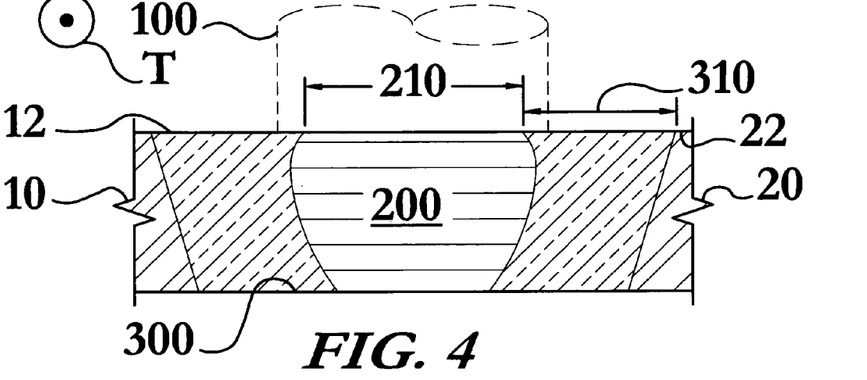
FIG. 4 shows a partial cross-sectional view of a friction stir weld.
Figure 5:
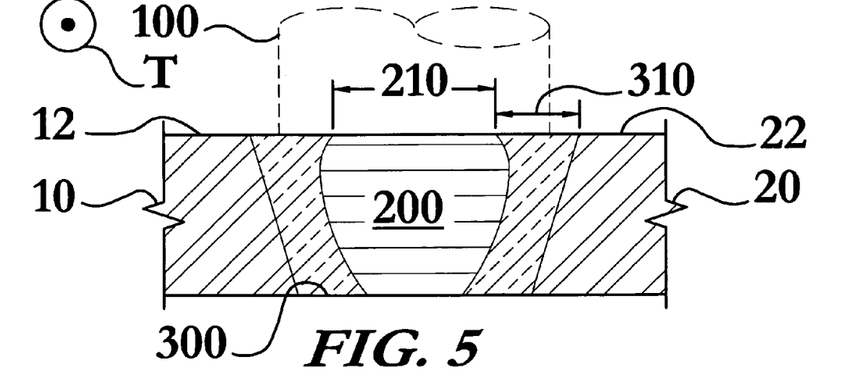
FIG. 5 shows a partial cross-sectional view of a friction stir weld produced using the instant invention.
Figure 6:
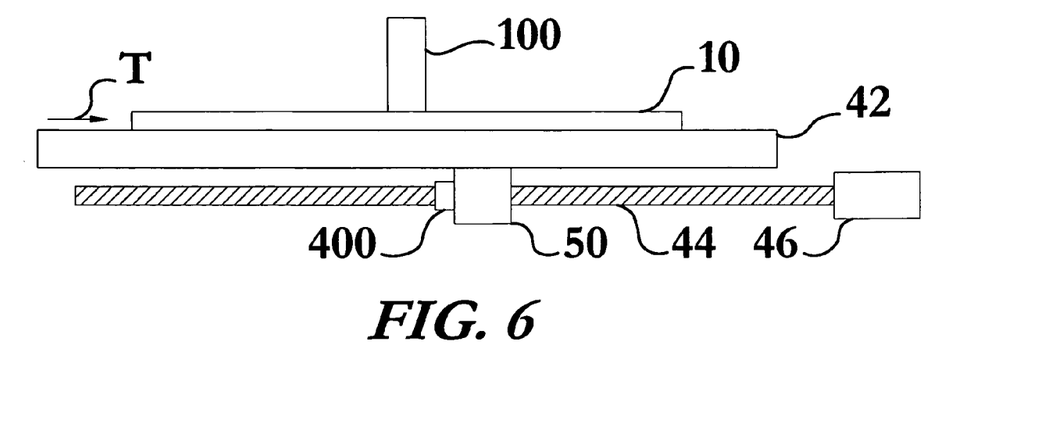
FIG. 6 shows a side elevation view of a typical friction stir welding setup.

The present invention is a friction stir welding (FSW) travel axis load control method and apparatus for controlling a travel axis load applied to a friction stir welding setup 40 during the joining of at least a first workpiece 10 and a second workpiece 20 by friction stir welding. In this process the workpieces 10, 20 are placed in close proximity to one another thereby forming a joint 30, best illustrated in FIG. 1. The friction stir welding setup 40 includes a mobile, or stationary, friction stir welding tool 100 having a probe 110, as seen in FIG. 2, for plunging into the joint 30 and a shoulder 120, and may include a mobile, or stationary, mounting table 42 having a plurality of clamping devices 48 to secure the workpieces 10, 20 to the table 42. Additionally, embodiments incorporating a mobile table 42 may include a drive screw 44 and at least one associated motor 46, illustrated in FIG. 6.

One with skill in the art will recognize that the FSW travel axis load control method and apparatus of the instant invention may be used to control the load applied to a mobile FSW tool 100 as it is moved through a joint 30 formed of stationary workpieces 10, 20, or conversely it may be used to control the load applied to a mobile table 42 as it moves the workpieces 10, 20 against a stationary FSW tool 100. Further, the travel axis load control method and apparatus may be incorporated into the controls of multi-axis FSW robots. FIGS. 1 through 7 illustrate embodiments wherein the table 42 moves relative to a stationary FSW tool 100. Additionally, while the figures and description herein generally refer to the travel axis load as a single dimensional load, it is contemplated, and disclosed here, that the travel axis load may be multi-dimensional and used in joining workpieces having complex and varying shapes, variable thickness, variable material characteristics, and variable thermal properties.

Referring again to FIG. 1 and FIG. 2, FSW begins with the step of plunging a rotating tool 100 into the joint 30 between the first and the second workpieces 10, 20 thereby creating a plasticized region 200. The plasticized region 200 in FSW is the region surrounding the tool 100 that has been softened by frictional and adiabatic heating to a point where the yield strength has been reduced sufficiently to permit local material flow around the probe 110. The rotation of the tool 100 develops frictional heating of the workpieces 10, 20 and the tool 100 forces plasticized workpiece material from the leading edge of the tool 100 to the rear of the tool 100, while confining the plasticized material from above by the shoulder 120, where it consolidates and cools to form a high quality weld.

Figure 7:
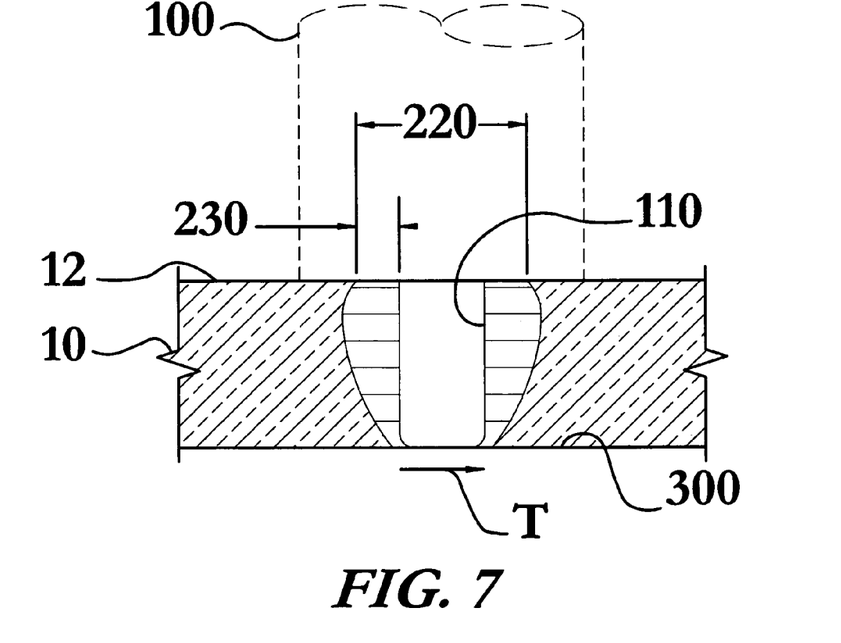
FIG. 7 shows a partial cross-sectional view of a friction stir weld produced using the instant invention.

The plasticized region 200 is characterized by a plasticized size having a plurality of dimensions. For example, the plasticized region 200 has a plasticized width 210, seen in FIG. 3, FIG. 4, and FIG. 5 where the direction of travel T of the workpieces 10, 20 is out of the page. Additionally, the plasticized region 200 has a plasticized length 220 having a tool lead dimension 230 representing the length of the plasticized region in front of the probe 110, as seen in FIG. 7 where the direction of travel T of the workpieces 10, 20 is to the right. The method and apparatus of the present invention controls any of a number of qualities associated with the plasticized region 200 thereby producing a weld having improved mechanical and aesthetic properties, as well as extending the life of the FSW tool 100. Additionally, the method and apparatus may control the FSW process to obtain a predetermined optimum size of a heat affected zone (HAZ) 300.

Referring again to FIG. 3, the illustrated weld is a typical weld produced by conventional FSW without the load control of the present invention. This illustrates the resulting weld produced when the FSW tool 100 progressed too quickly through the workpieces 10, 20 resulting in a weld that is too narrow having a plasticized width 210 that is less than optimal, and a HAZ width 310 that is less than optimal. The result of such a weld is lack of side wall fusion and lack of surface fusion. Additionally, moving the FSW tool 100 through the workpieces 10, 20 too quickly results in high stress on the tool 100 and often premature breakage.

Referring again to FIG. 4, the illustrated weld is another typical weld produced without the load control of the present invention. This weld is produced when the FSW tool 100 progresses too slowly through the workpieces 10, 20 resulting in a weld that is too wide having a plasticized width 210 that is greater than optimal, and a HAZ width 310 that is greater than optimal. The result of such a weld includes problematic surface blistering, excessive face side indentation, reduced mechanical properties, and potentially the loss of corrosion resistance in some alloys.

Referring again to FIG. 5, the illustrated weld is one produced using the load control of the present invention. The weld is characterized by an optimal plasticized width 210, and an optimal HAz width 310. The mechanical properties of the weld produced utilizing this load control methodology are dramatically improved over welds produced with constant travel speed control systems.

The method and apparatus of the present invention includes the step of generating a reference signal representative of at least one of the plasticized region dimensions. As previously mentioned, these dimensions may include the plasticized width 210, the plasticized length 220, and the tool lead dimension 230, among others.

The reference signal is then compared with a predetermined signal representative of at least one of a plurality of predetermined plasticized region dimensions, thereby generating an error signal representative of the difference between the at least one plasticized region dimension and the at least one predetermined plasticized region dimension. The predetermined plasticized region dimensions may include the plasticized width 210, the plasticized length 220, and the tool lead dimension 230, among others. Such predetermined plasticized region dimensions may be determined by actual experimentation or modeling. In one illustrative embodiment, optimal results were obtained when the reference signal was representative of a plasticized region tool lead dimension 230 and the predetermined signal was representative of a predetermined plasticized region tool lead dimension 230.

Lastly, the method and apparatus then controls the travel axis load based upon the error signal to maintain one of the at least one plasticized region dimensions substantially equal to one of the at least one predetermined plasticized region dimensions.

The reference signal representative of at least one of the plasticized region dimensions may be generated in a number of ways. For instance in the embodiment, illustrated in FIG. 6, having a mobile table 42 that is driven by a motor 46 connected to a drive screw 44 that engages a receiver 50 that is connected to the table 42, a simple load cell 400 may be attached to the receiver 50 to sense the load being applied against the FSW tool 100 by the workpieces 10, 20. Experimentation has shown that the measured load is proportional to, and therefore representative of, the amount of plasticized material in front of the probe 100, illustrated as the tool lead dimension 230 in FIG. 7. Therefore, an experimental sample weld may demonstrate that a travel axis load of 800 pounds of force produces optimal mechanical properties. Thus, when utilizing the method and apparatus of the present invention to weld the actual workpieces 10, 20 the predetermined signal may represent a travel axis load of 800 pounds of force. The reference signal may then be obtained from the load cell 400 reflecting the actual travel axis load and the error signal can then be easily obtained. The error signal then acts to control the motor 46 to produce a travel axis load of approximately 800 pounds of force, plus or minus an acceptable margin of error throughout the length of the weld. Therefore, the motor 46 would adjust the travel speed to obtain the predetermined load.

This method and apparatus is particularly useful in that a simple experimental determination of the optimal travel axis load may be applied to the welding process of very complex structures. For instance, a particular situation may call for the joining of two unique aluminum alloy components having a thickness of ⅛". The complex structure may include a wide range of stiffeners at variable spacing. A simple small-scale experimental setup using ⅛" thick plates of the unique aluminum alloy will provide the predetermined load that will result in the best particular characteristic of interest, be it fatigue resistance, ultimate tensile strength, or some other factor. This experimentally determined load may then be used when joining the materials of the large-scale complex structure to obtain similar results.

Figure 8:
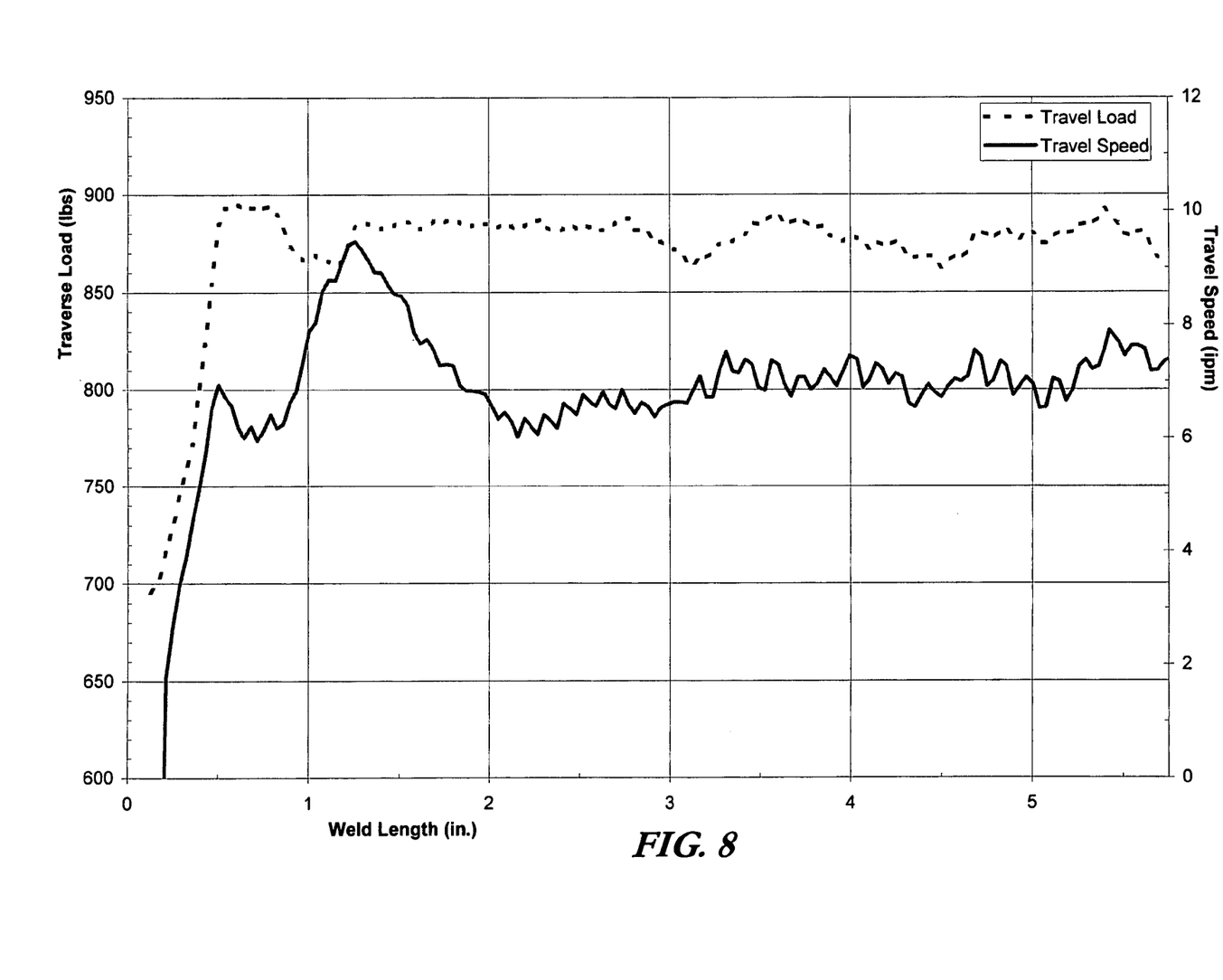
FIG. 8 shows a graph of the travel speed, in inches per minute, and the transverse load, in pound force, versus the weld length, or position, in inches.

FIG. 8 illustrates actual data acquired during the butt joining of two 1/8" thick sheets of material. The left vertical axis illustrates travel axis load, in pounds of force, and the right vertical axis illustrates the travel speed, in inches per minute. The horizontal axis indicates the position of the tool along the weld joint. As the weld starts, on the left side of the graph, the tool is accelerated into the joint until the load on the tool levels off at the predetermined desired load level of approximately 875 lbs. The load on the tool is maintained at approximately 875 lbs. as it progresses from approximately one inch to six inches along the joint. This load is maintained substantially uniform despite the fact that the materials being joined are getting increasing warmer, and therefore less resistant to the tool, the further along the joint the tool progresses. This can be observed by the increasing velocity of the tool from the second inch to the sixth inch, while the load is substantially uniform.

While the previous example simply discussed determining the load to produce optimal mechanical properties, this method and apparatus may be used to obtain much more specific properties. For instance, the method and apparatus may be used to establish plasticized region characteristics that reflect desirable fatigue properties, fracture toughness, crack growth, and ultimate tensile strength, among other factors.

In yet another embodiment, the reference signal representative of at least one of the plasticized region dimensions may be generated from at least one torque sensor measuring the torque on the tool. As previously explained with respect to load, experimentation may also be used to determine the torque on the tool that results in the at least one plasticized region dimension producing the desired weld characteristics.

Additional embodiments may utilize at least one workpiece temperature sensor to generate the reference signal. The at least one temperature sensor may measure the temperature of one, or all, of the workpieces at a predetermined location. For example, in a standardized manufacturing process similar to that illustrated in FIG. 1, the clamps 48 may incorporate temperature sensors, or thermocouples. Experimental analysis would then provide the temperature at the location of the clamps 48 that produces the desired weld characteristics and the travel axis load may be adjusted to obtain the desired temperature. Alternatively, the thermocouples may be incorporated into the table 42, rollers that track the tool 100, or even rollers that serve to secure the materials being joined. Other means of obtaining temperature measurements are contemplated, including, but not limited too, optical pyrometers, and infrared sensors.

Yet further alternative embodiments may actually measure the desired plasticized region dimension. Such measurement devices may include optical devices, mechanical devices, and electromagnetic devices, among others. These measurement devices may be most conveniently applied to the first and second workpiece bottom surfaces 14, 24.

Further embodiments may incorporate monitoring of changing surface characteristics to control the travel axis load in lieu of the plasticized region dimensions. Such surface characteristics may include workpiece reflectivity and surface coloration, among others. These characteristics may be measured with devices such as an optical reflectivity sensor or spectrophotometer. The changing surface characteristics may be monitored on the top surfaces 12, 22 of the first and second workpieces, or on the bottom surfaces 14, 24 of the first and second workpieces.

For example, the oxide layer on the surface of certain materials changes in the presence of heat. This is particularly true for copper where the human eye can observe changes in the oxide layer around the tool due to the heat of the FSW process. In this embodiment, the change in the oxide layer's characteristics can be measured and utilized to control the travel axis load. Such control permits the method to minimize the length of the preheat region in front of the tool, thereby preventing overheating yet ensuring proper preheating.

Additionally, the color of the material being joined by FSW often predictably changes in the vicinity of the tool during FSW. This is particularly true when joining steel or titanium components. For instance, steel changes from its normal room temperature grey color to orange in color around the tool. Such color variations can be measured and utilized to control the travel axis load.

While the disclosure herein refers generally to a first workpiece 10 and a second workpiece 20, the present invention may be used in joining more than just two workpieces or in the repair of a single workpiece. Further, the disclosure generally discusses generating the reference signal from the same side of the workpieces as that where the tool is plunged, however one with skill in the art will appreciate that sensing certain characteristics of the plasticized region may be accomplished from the opposite side of the workpieces. In fact, sensing the characteristics of the plasticized region on the opposite side of the workpieces is preferable in many embodiments. Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

We claim:

1. A friction stir welding travel axis load control method for controlling a travel axis load applied to a friction stir welding setup during the joining of at least a first workpiece and a second workpiece by friction stir welding wherein the workpieces are placed in close proximity to one another thereby forming a joint and wherein the friction stir welding setup includes a friction stir welding tool having a probe for plunging into the joint comprising the steps of:

rotating the tool and plunging the probe into the joint thereby creating a plasticized region, characterized by a plasticized size, having a plurality of dimensions, in the first workpiece and the second workpiece;

applying the travel axis load to the friction stir welding setup to create relative motion parallel the joint between the tool and the first and second workpieces;

generating a reference signal representative of at least one of the plasticized region dimensions;

comparing the reference signal with a predetermined signal representative of at least one of a plurality of predetermined plasticized region dimensions, thereby generating an error signal representative of the difference between the at least one plasticized region dimension and the at least one predetermined plasticized region dimension; and controlling the travel axis load based upon the error signal to maintain one of the at least one plasticized region dimensions substantially equal to one of the at least one predetermined plasticized region dimensions.

2. The method of claim 1, wherein the reference signal is representative of a plasticized region tool lead dimension and the predetermined signal is representative of a predetermined plasticized region tool lead dimension.

3. The method of claim 1, wherein the reference signal representative of at least one of the plasticized region dimensions is generated by measuring the force in the travel direction exerted on the joint by the tool.

4. The method of claim 1, wherein the reference signal representative of the at least one of the plasticized region dimensions is generated by measuring the torque on the tool.

5. The method of claim 1, wherein the reference signal representative of at least one of the plasticized region dimensions is generated by measuring the temperature of one of the workpieces at a predetermined location.

6. The method of claim 1, wherein the reference signal representative of at least one of the plasticized region dimensions is generated by measuring at least one physical dimension of the plasticized region.

7. The method of claim 1, wherein the predetermined signal representative of at least one of a plurality of predetermined plasticized region dimensions is experimentally determined.

8. A friction stir welding travel axis load control method for controlling a travel axis load applied to a friction stir welding setup during the joining of at least a first workpiece and a second workpiece, each workpiece having a plurality of surface characteristics, by friction stir welding wherein the workpieces are placed in close proximity to one another thereby funning a joint and wherein the friction stir welding setup includes a friction stir welding tool having a probe for plunging into the joint, comprising the steps of: rotating the tool and plunging the probe into the joint thereby creating a plasticized region, characterized by a plasticized size, having a plurality of dimensions, in the first workpiece and the second workpiece;

applying the travel axis load to the friction stir welding setup to create relative motion parallel to the joint between the tool and to first and second workpieces;

generating a reference signal representative of at least one of the plurality of surface characteristics;

comparing the reference signal with a predetermined signal representative of at least one of the plurality of surface characteristics, thereby generating an error signal representative of the difference between the at least one of the plurality of surface characteristics and the related at least one of the plurality of predetermined surface characteristics; and controlling the travel axis load based upon the error signal to maintain one of the at least one plurality of surface characteristics substantially equal to one of the at least one plurality of predetermined surface characteristics.

9. The method of claim 8, wherein the reference signal is representative of a workpiece reflectivity and the predetermined signal is representative of a predetermined workpiece reflectivity.

10. The method of claim 8, wherein the reference signal is representative of a workpiece surface coloration and the predetermined signal is representative of a predetermined workpiece surface coloration.

11. The meted of claim 8, wherein the predetermined signal representative of the at least one of the plurality of predetermined surface characteristics is experimentally determined.

12. A friction stir welding apparatus capable of controlling a travel axis load applied to a friction stir welding setup during the joining of at least a first workpiece and a second workpiece by friction stir welding Wherein the workpieces are placed in close proximity to one another thereby forming a joint, comprising:

a friction stir welding tool having a probe for plunging into the joint, whereby a plasticized region characterized by a plasticized size, having a plurality of plasticized dimensions is created by the rotation of the plunged probe;

a load actuator for applying the travel axis load to the friction stir welding setup to create relative motion parallel to the joint between the tool and the first and second workpieces;

a sensor for sensing at least one of the plasticized region dimensions and generating a reference signal representative of the sensed dimension; and a load control center capable of receiving the reference signal, comparing the reference signal with a predetermined signal representative of at least one of a plurality of predetermined plasticized region dimensions, generating an error signal representative of the difference between the at least one plasticized region dimension and the at least one predetermined plasticized region dimension, and transmitting the error signal to the load actuator for controlling the travel axis load to maintain one of the at least one plasticized region dimensions substantially equal to one of the at least one predetermined plasticized region dimensions.

13. The apparatus of claim 12, wherein the reference signal is representative of a plasticized region tool lead dimension and the predetermined signal is representative of a predetermined plasticized region tool lead dimension.

14. The apparatus of claim 12, wherein the reference signal representative of at least one of the plasticized region dimensions is generated from a load cell measuring the force in the travel direction exerted on the joint by the tool.

15. The apparatus of claim 12, wherein the reference signal representative of the at least one of the plasticized region dimensions is generated from a torque sensor by measuring the torque on the tool.

16. The apparatus of claim 12, wherein the reference signal representative of at least one of the plasticized region dimensions is generated from at least one workpiece temperature sensor by measuring the temperature of one of the workpieces at a predetermined location.

17. The apparatus of claim 16, wherein the at least one workpiece temperature sensor is a thermocouple.

18. The apparatus of claim 16, wherein the at least one workpiece temperature sensor is an optical pyrometer.

19. The apparatus of claim 12, wherein the reference signal representative of at least one of the plasticized region dimensions is generated from at least one dimensional measurement device.

20. The apparatus of claim 19, wherein the at least one dimensional measurement device is an optical measurement device.

21. The apparatus of claim 19, wherein the at least one dimensional measurement device is a mechanical measuring device.

22. The apparatus of claim 19, wherein the at least one dimensional measurement device is an electromagnetic measurement device.

23. The apparatus of claim 12, wherein the predetermined signal representative of at least one of a plurality of predetermined plasticized region dimensions is experimentally determined.

24. A friction stir welding apparatus capable of controlling a travel axis load applied to a friction stir welding setup during the joining of at least a first workpiece and a second workpiece, each workpiece having a plurality of surface characteristics, by friction stir welding wherein the workpieces are placed in close proximity to one another thereby forming a joint, comprising:
- a friction stir welding tool having a probe for plunging into the joint whereby a plasticized region characterized by a plasticized size, having a plurality of plasticized dimensions is created by the rotation of the plunged probe;
- a load actuator for applying the travel axis load to the friction stir welding setup to create relative motion parallel to the joint between the tool and the first and second workpieces;
- a sensor for sensing at least one of the plurality of surface characteristics and generating a reference signal representative of the sensed characteristic; and
- a load control center capable of receiving the reference signal, comparing the reference signal with a predetermined signal representative of at least one of a plurality of predetermined surface characteristics, generating an error signal representative of reference surface characteristics and the predetermined surface characteristics, and transmitting the error signal to the load actuator for controlling the travel axis load to maintain at least one of the plurality of surface characteristics substantially equal to at least one of the plurality of predetermined surface characteristics.

25. The apparatus of claim 24, wherein the reference signal is representative of a workpiece reflectivity and the predetermined signal is representative of a predetermined workpiece reflectivity.

26. The apparatus of claim 24, wherein the reference signal is representative of a workpiece surface coloration and the predetermined signal is representative of a predetermined workpiece surface coloration.

27. The apparatus of claim 25, wherein the reference signal representative of a workpiece reflectivity is generated from an optical reflectivity sensor.

28. The apparatus of claim 26, wherein the reference signal representative of a workpiece surface coloration is generated from at least one spectrophotometer.

29. The apparatus of claim 24, wherein the predetermined signal representative of the at least one of the plurality of predetermined surface characteristics is experimentally determined.

* * * * *